United States Patent

Nied et al.

Patent Number: 5,156,316
Date of Patent: Oct. 20, 1992

[54] FRICTION WELDING TEMPERATURE MEASUREMENT AND PROCESS CONTROL SYSTEM

[75] Inventors: Herman A. Nied, Ballston Lake; Robert E. Sundell, Clifton Park, both of N.Y.

[73] Assignee: General Electric Company, Schenectady, N.Y.

[21] Appl. No.: 718,041

[22] Filed: Jun. 20, 1991

[51] Int. Cl.⁵ .................... B23K 20/12; B23K 20/26
[52] U.S. Cl. ................................. 228/2; 228/9; 228/102; 228/112
[58] Field of Search ............. 228/102, 2, 9, 110, 228/112, 113, 176, 200, 240; 219/101, 104

[56] References Cited

U.S. PATENT DOCUMENTS

| | | | |
|---|---|---|---|
| 4,441,248 | 4/1984 | Sherman et al. | 228/179 |
| 4,555,052 | 11/1985 | Kurtz et al. | 228/104 |
| 4,596,917 | 6/1986 | Nied et al. | 219/109 |
| 4,705,204 | 11/1987 | Hirota et al. | 228/179 |
| 4,721,947 | 1/1988 | Brown | 228/56.5 |

FOREIGN PATENT DOCUMENTS

| | | | |
|---|---|---|---|
| 2837284 | 3/1979 | Fed. Rep. of Germany | 228/102 |
| 0688309 | 9/1979 | U.S.S.R. | 228/114 |

OTHER PUBLICATIONS

Metals Handbook 9th Ed vol. 6, "Special Welding Processes" p. 728.

Primary Examiner—Richard K. Seidel
Assistant Examiner—Jeanne M. Elpel
Attorney, Agent, or Firm—James R. McDaniel; Paul R. Webb, II

[57] ABSTRACT

In order to determine the temperature of a weld produced by a friction welding process, an electrical signal having a low voltage and a low current is passed through the weld. The weld acts as a resistor due to its high temperature as compared to the surrounding material such that the current in the electrical signal changes after its interacts with the weld. The change in current can be measured and the temperature of the weld can be determined.

5 Claims, 2 Drawing Sheets

FRICTION WELDING TEMPERATURE MEASUREMENT AND PROCESS CONTROL SYSTEM

CROSS REFERENCE TO RELATED APPLICATIONS

This application is related to commonly assigned U.S. patent application Ser. No. 07/718,042, entitled "CONCURRENT FRICTION/JOULE HEATING WELD PROCESS".

BACKGROUND OF THE INVENTION

1. Field of the Invention

This invention relates to a friction welding temperature measurement and process control. Structures of this type generally allow the temperature of the weld formed by friction welding to be accurately determined such that the friction welding process can be more precisely controlled which, ultimately, produces a repeatable good weld quality.

2. Description of the Related Art

Friction welding is quickly becoming the desired technique used to weld high temperature materials together including advanced composites. However, in order to properly perform a friction weld, the temperature at the interface between the materials must reach a suitable value but, be below the melting temperature. It is known in prior friction welding temperature measurement devices to employ conventional thermocouples at or near the weld as the temperature measuring device. However, the thermocouples usually are destroyed during the welding process and the thermocouples, themselves, are equal to or larger in size than the weld region. For example, the heat-affected zone of a typical friction weld is 3-4 mils in width and a conventional thermocouple is usually 4-5 mils in width. Consequently, the destruction of the thermocouple and its size make it prohibitive when trying to accurately determine the temperature of the weld. Therefore, a more advantageous system, then, would be presented if a less intrusive weld temperature measurement system could be employed.

In order to avoid the inherent problems associated with using thermocouples as the weld temperature measuring device, other temperature measuring techniques using IR sensing methods have been employed. While these methods measure the weld temperature, the flash created during the friction welding process may obscure the temperature measurement. Also, the thermal emissivity of the materials being friction welded varies during the process which must be taken into account in using IR sensing methods. Consequently, a further advantageous system, then, would be presented if a less intrusive temperature measuring and control system could be used which provided more accurate temperatures of the weld while avoiding complex monitoring systems.

It is apparent from the above that there exists a need in the art for a temperature measurement and process control system which measures and controls the temperature of a friction weld, and which at least measures and controls the weld temperature in an unobtrusive manner, but which at the same time provides a more accurate determination of the weld temperature.

SUMMARY OF THE INVENTION

Generally speaking, this invention fulfills these needs by providing a friction welding temperature measurement and process control system, comprising a friction welding means which produces a friction weld, a temperature sensing means electrically attached to said welding means which provides an electrical signal, and a control means which processes said electrical signal to control said friction welding means.

In certain preferred embodiments, the temperature measuring means is a constant voltage source having a low current. Also, the control means is an electrical feedback and a microprocessor.

In another further preferred embodiment, the temperature of the friction weld is accurately measured in an unobtrusive manner.

The preferred friction welding temperature measurement and process control system, according to this invention, offers the following advantages: good stability; improved temperature measurement accuracy; ease of temperature measurement; good economy; repeatable weld quality; direct measurement at the weld interface and high strength for safety. In fact, in many of the preferred embodiments, these factors of improved accuracy, ease of temperature measurement, direct temperature measurement and repeatable weld quality are optimized to an extent considerably higher than heretofore achieved in prior, known friction welding temperature measurement systems.

BRIEF DESCRIPTION OF THE DRAWINGS

The above and other features of the present invention which will become more apparent as the description proceeds are best understood by considering the following detailed description in conjunction with the accompanying drawings wherein like characters represent like parts throughout the several views and in which.

DETAILED DESCRIPTION OF THE INVENTION

Friction welding is a widely accepted solid state joining process which has recently aroused interest in the aerospace industry for the welding of advanced materials, composites and dissimilar materials which cannot be easily joined by conventional methods. Friction welding produces a very narrow process and heat affected zone, hereinafter, referred to as a HAZ. This occurs due to the highly localized heating at the interface of the components to be joined. In the friction welding process, the intense but short duration of mechanical energy dissipation in the form of heat at the material interface surfaces, subjects the metal to high strain rate deformation and a rapid increase in temperature, typically, reaching temperatures of over 1000° F. followed by an extremely rapid quenching action due to heat conduction into the surrounding material. This rapid heat input produces extremely steep temperature gradients and the resulting cool down has a tremendous influence on the microstructure generated in the narrow process zone. The rapid cool down is known to produce a martensitic type structure in certain alloys such as titanium alloys, and consequently, a brittle region.

Figure 1:
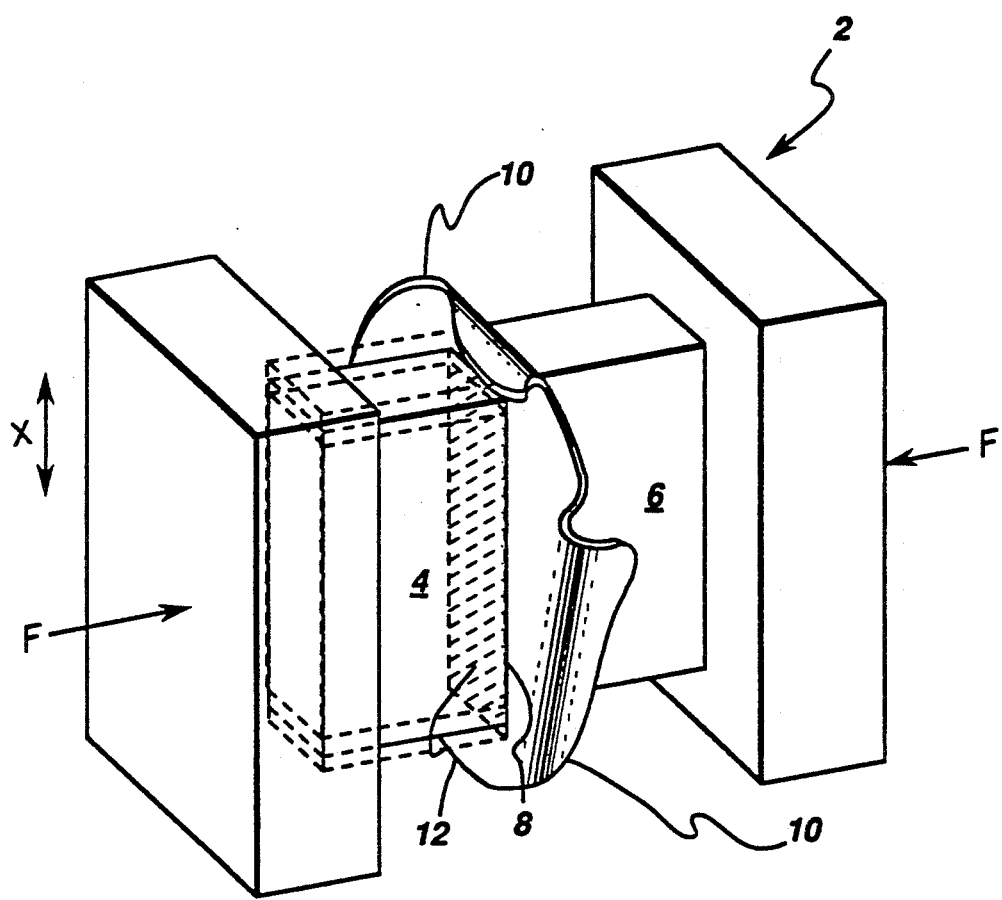
FIG. 1 is a schematic drawing of a conventional linear reciprocating friction welding process.

With respect to FIG. 1, there is illustrated a schematic representation of a conventional linear reciprocating friction welding apparatus 2. In particular, apparatus 2 includes a component 4 attached to an oscillating head stock 3, a mating component 6 attached to a stationary tail stock 5, friction weld interface 8, flash 10 and HAZ 12. A force F, typically, around 10,000 pounds, is placed on stocks 3,5 while head stock 3 oscillates along direction X, preferably, between 10–90 Hz. It is to be understood that while linear reciprocating friction welding is being illustrated, it is illustrated only as an example, for the present invention is applicable in all types of friction welding, for example, continuous rotational friction welding, inertia friction welding, friction surfacing and orbital friction welding.

As mentioned earlier, it is important to measure the temperature in HAZ 12 in order to be certain that the process parameters will produce the proper temperature at the interface between components 4,6. It has been determined that the high temperature narrow weld region or HAZ 12 has a significantly higher electric resistance compared to the rest of the material surrounding HAZ 12. The present invention employs the dynamic resistance in the HAZ 12 as the process variable to provide an accurate determination of the weld temperature in this region.

Figure 2:
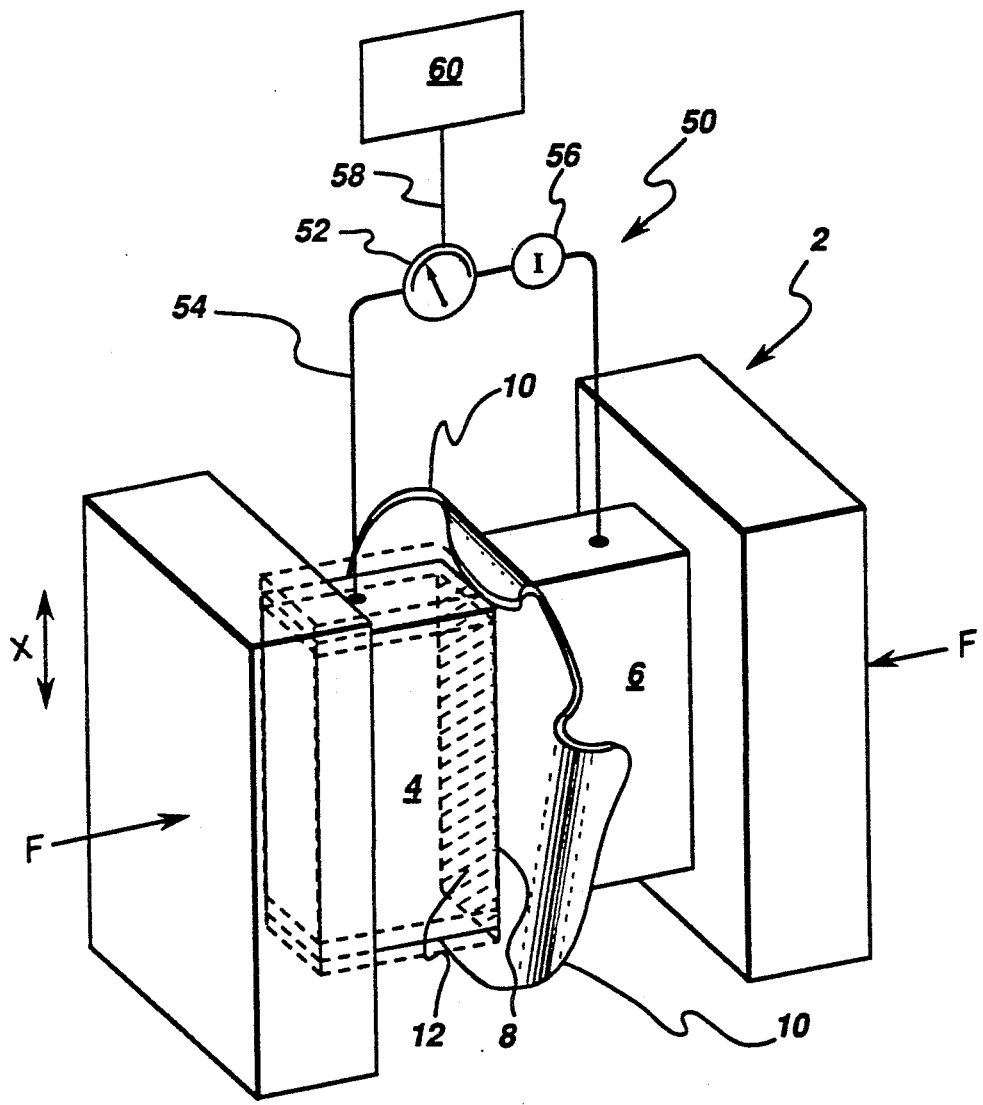
FIG. 2 is a schematic drawing of a friction welding temperature measurement and process control system, according to the present invention.

FIG. 2 shows a friction welding temperature measurement and process control system 50. System 50 includes friction welding apparatus 2, AC/DC voltage supply 52 having impedance 56, conventional electrical leads 54,58 and process controller 60. In particular, voltage source 52 must be constructed such that it will deliver a low voltage, preferably, 3–4 volts and a low current, preferably, around 100 milliamps. Process controller 60 includes a conventional microprocessor having a dynamic feedback control system.

In operation, as component 4 held in head stock 3 oscillates against component 6 held in tail stock 5 to create HAZ 12, friction weld 8 is created. In order to obtain the temperature of HAZ 12 and weld zone 8, a voltage drop is placed across weld 8 by power source 52 and leads 54 and the current in power source 52 is measured by conventional current measuring techniques in process controller 60. Leads 54 are attached to components 4,6 by conventional techniques. Controller 60 then computes by conventional methods the dynamic electrical resistance in weld 8 in real time during the friction welding process. The effective temperature of weld zone 8 is calculated by controller 60 using a well known temperature calculation method which is based on the known specific resistance of the materials being welded. The specific resistance as a function of temperature for various temperatures can be found in a large variety of scientific literature, for example, *Combined Properties of Conductors* by Avraham Tslaf, published by Elsevier Scientific Publishing Company, 1981. Once the temperature of weld 8 is determined during a particular part of the welding process, that temperature can be compared to the desired temperature to see if the desired temperature is reached. For example, when friction welding titanium, it is desired that the weld reach a temperature of approximately 1600°–1800° F. If controller 60 shows that the temperature of weld 8 is only 1200° F., then the welding process can be modified, for example, by increasing the oscillation rate of head stock 3.

Controller 60 can also use through well known feedback techniques, the data on the dynamic resistance or the computed effective temperature of weld 8 as an input variable in the dynamic feedback control system in controller 60 to assure welding repeatability and quality.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A friction welding temperature measurement and process control system, said system comprised of:
    a friction welding means which produces a friction weld;
    a temperature sensing means electrically attached to said welding means which provides an electrical signal and which is further comprised of a power source having a low voltage and a low current; and
    a control means which processes said electrical signal to control said friction welding means.

2. The system, according to claim 1, wherein said control means is further comprised of:
    a microprocessor means; and
    a dynamic feedback control means.

3. The friction welding temperature measurement and process control method having a friction welding means, a temperature sensing means and a control means, said method comprised of the steps of:
    operating said welding means;
    initiating said temperature sensing means;
    operating a power supply means to supply a low voltage and a low current to said friction welding means;
    observing and recording said friction welding temperature through said temperature sensing means and said control means; and
    controlling said friction welding temperature by said control means.

4. The measurement and control method, according to claim 3, wherein said step of observing and recording said friction welding temperature is further comprised of the steps of:
    applying a voltage from said power source;
    determining a current;
    transmitting said voltage and said current to said control means to compute a resistivity in said weld; and
    determining an effective temperature of said weld in said control means.

5. The measurement and control method, according to claim 4, wherein said step of controlling said friction welding temperature is further comprised of the steps of:
    determining a desired friction welding temperature; and
    adjusting said friction welding means such that said effective friction welding temperature substantially coincides with said desired friction welding temperature.

* * * * *